Oct. 24, 1967  W. A. CURTIS ETAL  3,348,861
TRAILER SPARE AND THIRD WHEEL
Filed Feb. 25, 1966  2 Sheets-Sheet 1
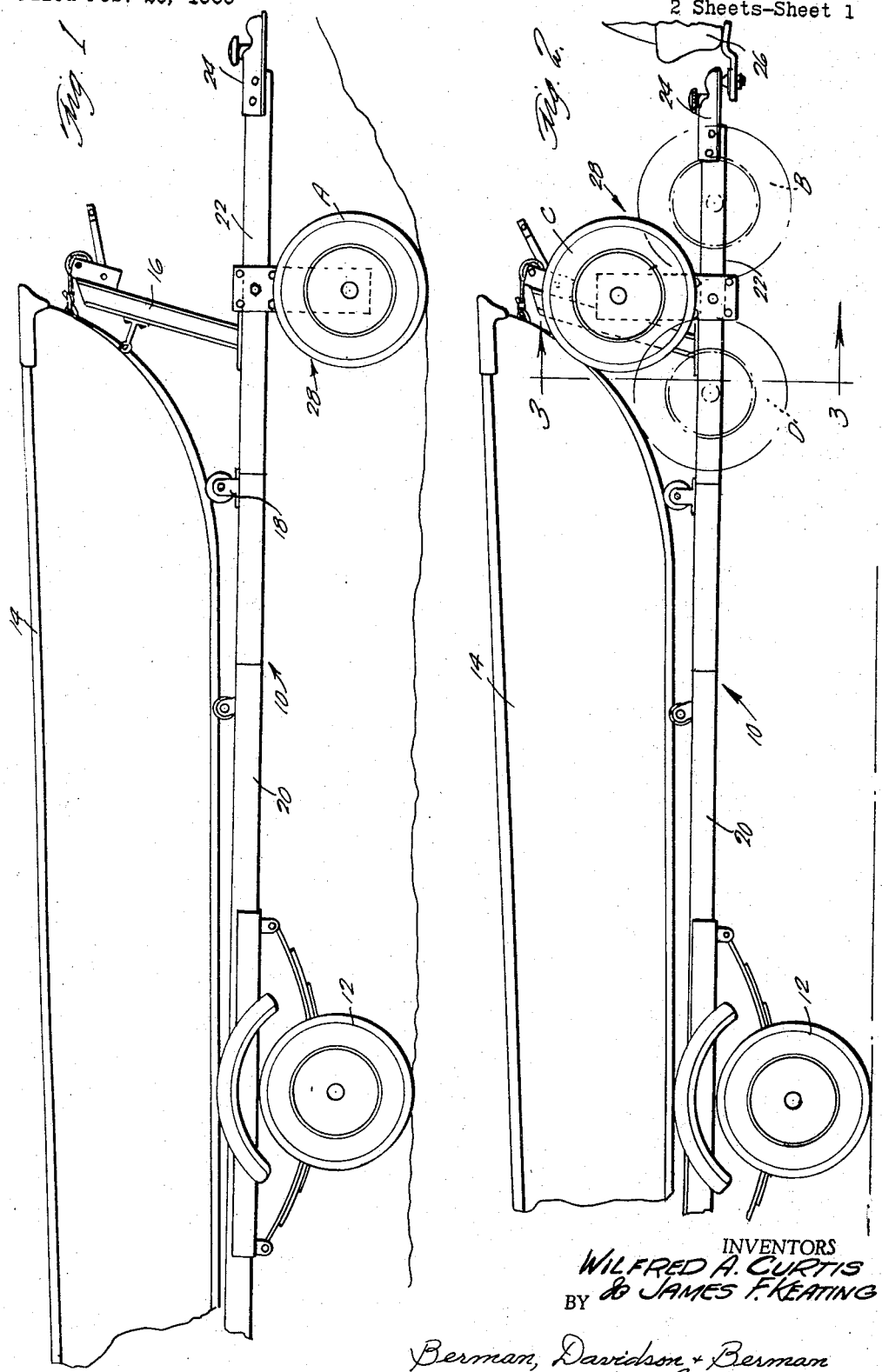
INVENTORS
WILFRED A. CURTIS
BY & JAMES F. KEATING
Berman, Davidson & Berman
ATTORNEYS Oct. 24, 1967   W. A. CURTIS ET AL   3,348,861
TRAILER SPARE AND THIRD WHEEL
Filed Feb. 25, 1966   2 Sheets-Sheet 2
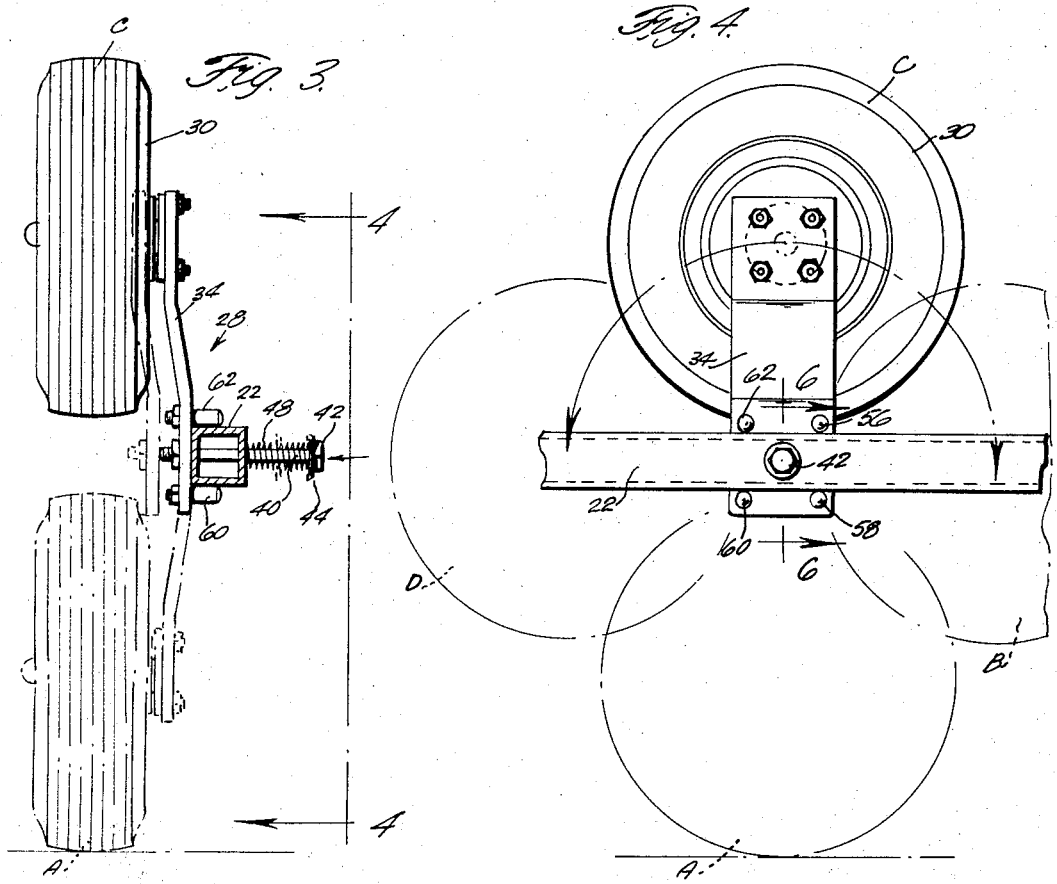
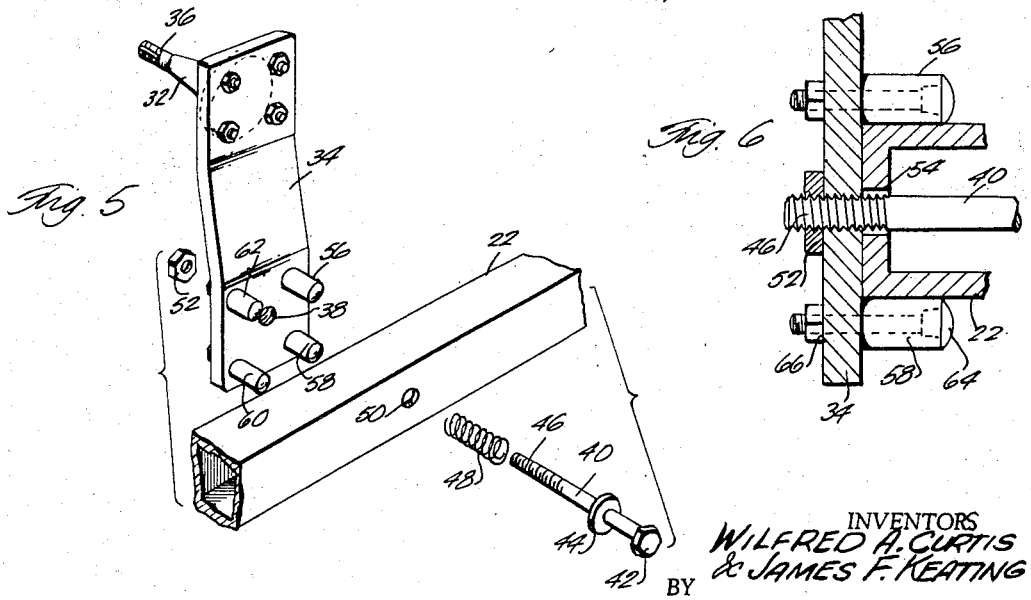
INVENTORS
WILFRED A. CURTIS
& JAMES F. KEATING
BY
Berman, Davidson & Berman
ATTORNEYS United States Patent Office 3,348,861
Patented Oct. 24, 1967

3,348,861
TRAILER SPARE AND THIRD WHEEL
Wilfred A. Curtis, Depot St., North Woodstock, N.H. 03262, and James F. Keating, D.W.H. 3, Woodstock, N.H. 03262
Filed Feb. 25, 1966, Ser. No. 530,197
4 Claims. (Cl. 280—475)

ABSTRACT OF THE DISCLOSURE

A third wheel assembly for a trailer in which the third wheel is mounted on an elongated arm depending from the trailer draw bar, which pivotally moves through an arc of 360° in a plane parallel thereto, from a wheel ground-engaging position to a variety of convenient storage positions. Lock means are provided on the arm, consisting of four studs arranged in a square array for overlying and underlying the draw bar at 90° intervals of movement of the arm for locking the assembly in place. The third wheel is removably mounted on the arm for use as a spare tire.

---

This invention relates to a trailer spare and third wheel assembly for a trailer.

While the invention will be described herein as applied to a two-wheel boat trailer, it is to be understood that it may be usefully employed with many other types of trailers. The problems solved by this invention are particularly apparent however, when a boat trailer is considered.

A third wheel is required to give support and mobility to a boat trailer whenever the trailer is removed from its draft vehicle. On the other hand, when the trailer is being drawn by the vehicle, it is preferable that the third wheel not be in contact with the ground, as this will merely increase frictional resistance to the trailer as it is drawn.

While in storage, space requirements may dictate a particular position for the assembly, depending upon the shape of the object transported. Thus, the storage position of the third wheel assembly must be flexible and the assembly disclosed meets this requirement.

When the trailer arrives at its destination, it is usually desired to maneuver into a relatively confined area. This is generally a difficult procedure when the trailer is attached to the draft vehicle, and as a result, the trailer is usually unhitched from the vehicle and maneuvered into the desired position, by hand. The addition of a ground-engaging third wheel on the trailer structure enables ready manipulation.

The third wheel on the trailer in the present invention is also readily removable from its mounting for use as a spare. Most trailers neither furnish a spare wheel and tire nor even a place to carry one, and thus the removable third wheel, convertible to a spare tire, provides for increased trailer efficiency in emergency situations.

Accordingly, it is an object of this invention to provide a third wheel assembly for providing additional support for a trailer whenever additional support is deemed necessary.

It is still another object of this invention to provide a third wheel assembly for a trailer which increases its degree of mobility and ease of handling.

A still further object of this invention is to provide a third wheel assembly which can be readily swung from a trailer support position to multiple storage positions on the trailer in accordance with available space requirements.

A still further object of this invention is to provide a third wheel assembly for a trailer wherein the third wheel is removable and convertible to a trailer spare tire.

Further objects and advantages of this invention will become apparent from the following description and claims, and from the accompanying drawings, wherein:

FIGURE 1 is a fragmentary side view in elevation of a boat trailer provided with the third wheel assembly of the present invention;

FIGURE 2 is a view similar to FIGURE 1 but illustrating the third wheel assembly in a stored, rather than ground engaging support position;

FIGURE 3 is a cross-sectional view taken substantially along the plane indicated by the line 3—3 of FIGURE 2 and illustrating the particular construction of the third wheel assembly;

FIGURE 4 is a fragmentary side view in elevation of the third wheel assembly as seen from the plane indicated by the line 4—4 of FIGURE 3;

FIGURE 5 is an exploded perspective view of the third wheel assembly; and

FIGURE 6 is a cross-sectional view taken substantially along the plane indicated by the line 6—6 of FIGURE 4.

Referring now to the drawings in detail, wherein like numerals indicate like elements throughout the several views, reference numeral 10 generally indicates a common type of boat trailer having a pair of wheels 12 connected by an axle (not shown).

The trailer 10 supports a boat 14 during its transport and is provided with conventional supporting structures 16 and 18, which does not form a part of the present invention. The trailer 10 includes a frame construction 20 provided with a draw bar 22 projecting from its forward end. The draw bar 22 terminates in a coupling member 24 by means of which the trailer 10 may be hitched to the rear bumper of an automobile 26 or other draft vehicle.

When the trailer 10 is hitched to the automobile 26 as shown in FIGURE 2, the third wheel assembly, generally indicated by the numeral 28, is maintained preferably in any one of the three storage positions, indicated at B, C, and D. When the automobile is unhitched from the trailer 10 at a predetermined location, the third wheel assembly 28 is pivoted to a ground-engaging position, as shown at A, for additional trailer support and increased mobility.

As shown in FIGURE 1, the entire weight of the boat 14 and trailer 10 is supported by three wheels during a maneuvering operation, and the entire unit may be readily moved about by a single person without the need for lifting the trailer and supporting the weight of the boat.

The third wheel assembly 28 is adapted to be mounted upon the draw bar 22 of the frame 20 of the boat trailer 10. The third wheel assembly 28 includes a third wheel and trailer spare 30 mounted upon a spindle 32 projecting laterally from one end of an elongated mounting arm 34. The spindle 32 is provided with a threaded end 36 upon which a lock plate and nut can be provided to securely bind the third wheel and trailer spare 30 to the arm 34. Thus, the third wheel and trailer spare 30 can be readily removed from the arm 34 in the event a spare wheel is needed to replace a trailer wheel 12.

The mounting arm 34 is pivotably mounted upon the draw bar 22. The end of the mounting arm 34 remote from spindle 32 is provided with a threaded aperture 38 for receiving a pivot pin 40, insertable through aligned openings 50 and 54 in the draw bar 22, and having a threaded end 46 for connection within the threaded aperture 38. A lock nut 52 is also positioned upon the threaded end 46 of the pivot pin 40 to prevent relative movement between the pivot pin and arm 34.

The pivot pin 40 is provided with a head 42, and a washer 44 on its shank between the draw bar 22 and head 42. A coil spring 48 encircles the shank of the pivot pin 40 and is placed under compression between the draw bar 22 and washer 44. Accordingly, the coil spring 48 will tend to expand and bias the washer 44, head 42, and hence, pin 40 away from the draw bar 22 as shown in FIGURE 3. This will cause the arm 34 to be tightly held in abutment with the draw bar and maintain the third wheel and trailer spare 30 in either its stored or ground-engaging position.

To swing the third wheel and trailer spare 30 to any position within an arc of 360° in a plane parallel to the draw bar, it is only necessary to exert a force on head 42 of pivot pin 40 in the direction of the arrow shown in FIGURE 3, and compress the coil spring 48 and move pivot pin 40 and arm 34 to the phantom line position illustrated. Once sufficient clearance has been achieved between arm 34 and draw bar 22, arm 34 can freely swing through an arc of 360°.

The present invention contemplates storage of the third wheel assembly in multiple positions upon the draw bar 22, each storage position being spaced 90° from each other. This will enable the user of the third wheel assembly and boat trailer to position the third wheel assembly in a least obstructive position upon the trailer depending upon the nature of the object carried by the trailer and resultant space requirements.

Therefore, the third wheel assembly is provided with means for locking the third wheel 30 in any one of the storage positions B, C, and D, each of which is disposed 90° from each other and in a range of between 90° and 270° from ground-engaging position A. Surrounding threaded aperture 38, in a square array, are four rollers 56, 58, 60, and 62. Each roller is carried by arm 34 by means of a bolt 64 extending through the roller and arm and secured by a nut 66.

As shown in FIGURES 3 and 4, the third wheel 30 is firmly locked in stored position C upon draw bar 22 by disposing rollers 56 and 62 above the draw bar and 58 and 60 below the draw bar. Pressure upon head 42 of pivot pin 40 against the bias of spring 48 will cause the pivot pin 40 and arm 34 to move to a position wherein the rollers clear the draw bar 22, and the arm 34 can freely swing to positions D, A, or B in a clockwise or counterclockwise direction. In position B, rollers 60 and 62 will be above the draw bar 22 and 56 and 58 below. In position D, the rollers 56 and 58 will overlie the draw bar whereas rollers 60 and 62 will be beneath it. In the ground-engaging position A, rollers 58 and 60 will be above the draw bar 22 while rollers 56 and 62 will underlie it.

Accordingly, the simplicity of construction of the trailer spare and third wheel assembly as well as its adaptability to changing load conditions upon the trailer result in an improved construction.

While a specific embodiment of our invention has been disclosed in the foregoing description, it will be understood that various modifications within the spirit of the invention may occur to those skilled in the art. Therefore, it is intended that no limitations be placed on the invention except as defined by the scope of the appended claims.

We claim:
1. A third wheel assembly adapted to be mounted upon the forwardly extending draw bar of a trailer frame, said assembly comprising a third wheel, means for pivotably mounting said third wheel on said draw bar for movement through an arc of 360° in a plane parallel thereto, and lock means on said mounting means for preventing further movement of said third wheel at 90° intervals of its arcuate movement, said mounting means including an elongated arm mounting said third wheel at one end thereof, hinge means for pivotably connecting the other end of said arm to the draw bar of said trailer frame, said hinge means including a pivot pin secured to said elongated arm and adapted to extend through said draw bar, and spring means on said pivot pin for urging said elongated arm into abutment with said draw bar.

2. A third wheel assembly in accordance with claim 1 wherein said lock means includes four studs arranged in a square array on the end of said arm adjacent said hinge means and projecting perpendicular therefrom towards said draw bar, said studs being adapted to project above and below the surface of said draw bar under the urging of said spring means for retaining said arm in captive relation relative to said draw bar.

3. A third wheel assembly in accordance with claim 1 wherein said third wheel is removably connected to said elongated arm, whereby said third wheel can serve as a spare for wheels on said trailer frame.

4. A third wheel assembly adapted to be mounted upon the forwardly extending draw bar of a trailer frame, said assembly comprising a third wheel, means for pivotably mounting said third wheel on said draw bar for movement through an arc of 360° in a plane parallel thereto, said mounting means including an elongated arm mounting said third wheel at one end thereof, hinge means for pivotably connecting the other end of said arm to the draw bar of said trailer frame, said hinge means including a pivot pin secured to said elongated arm and adapted to extend through said draw bar, and spring means on said pivot pin for urging said elongated arm into abutment with said draw bar.

References Cited

UNITED STATES PATENTS

| | | | |
|---|---|---|---|
| 1,559,541 | 11/1925 | Ballentine | 280—475 |
| 2,296,789 | 9/1942 | Johnson | 280—475 X |
| 2,711,259 | 6/1955 | Jones. | |
| 2,830,828 | 4/1958 | Flanagan | 280—414 |
| 2,926,930 | 3/1960 | Pease | 280—475 |
| 2,981,552 | 4/1961 | Rutigliano | 280—150.5 |
| 3,237,960 | 3/1966 | Ziegler et al. | 280—150.5 X |
| 3,295,864 | 1/1967 | Norrby | 280—414 |

FOREIGN PATENTS 883,383   7/1953   Germany.

LEO FRIAGLIA, *Primary Examiner.*